US008421906B2

(12) United States Patent
Pollard

(10) Patent No.: US 8,421,906 B2
(45) Date of Patent: Apr. 16, 2013

(54) METHOD AND DIGITAL IMAGING APPLIANCE ADAPTED FOR SELECTING A FOCUS SETTING

(75) Inventor: Stephen Pollard, Dursley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 13/126,070

(22) PCT Filed: Oct. 31, 2008

(86) PCT No.: PCT/EP2008/064810
§ 371 (c)(1),
(2), (4) Date: Apr. 26, 2011

(87) PCT Pub. No.: WO2010/049004
PCT Pub. Date: May 6, 2010

(65) Prior Publication Data
US 2011/0211108 A1 Sep. 1, 2011

(51) Int. Cl.
*G03B 13/00* (2006.01)
*H04N 5/232* (2006.01)

(52) U.S. Cl.
USPC .......................................... 348/352; 348/349

(58) Field of Classification Search .................. 348/349, 348/352, 345, 351
See application file for complete search history.

(56) References Cited

U.S. PATENT DOCUMENTS

| 8,045,046 | B1 * | 10/2011 | Li et al. .......................... 348/349 |
| 8,228,383 | B2 * | 7/2012 | Sugiura .......................... 348/169 |
| 2002/0191973 | A1 | 12/2002 | Hofer et al. |
| 2006/0066744 | A1 | 3/2006 | Stavely et al. |
| 2008/0025716 | A1 | 1/2008 | Yost et al. |
| 2012/0120305 | A1 * | 5/2012 | Takahashi ..................... 348/352 |

FOREIGN PATENT DOCUMENTS

| GB | 2421131 A | 6/2006 |
| WO | 2008083403 A | 7/2008 |

OTHER PUBLICATIONS

International Search Report and Written Opinion for PCT Application No. PCT/EP2008/064810. European Patent Office. Jul. 7, 2009.

\* cited by examiner

*Primary Examiner* — Tuan Ho
*Assistant Examiner* — Shahbaz Nazrul

(57) ABSTRACT

A method for selecting a focus setting for a digital image acquisition appliance, the method comprising: acquiring a first image (350) with a first focus setting (100), acquiring a second image with a second focus setting (102), the second image being acquired sequentially with the first image, dividing the first image (350) into a first grid (104) of macroblocks (352), dividing the second image (106) into a second grid of macroblocks, determining a first zone (354) in the first grid of macroblocks and a second zone in the second grid of macroblocks (108) using a first predetermined selection criteria, calculating a macroblock shift (110) of the first zone with respect to the second zone to a sub-macroblock precision, calculating a first value of a figure-of-merit for the first image and a second value of the figure-of-merit for the second image (112), the first value being calculated using focus metric data obtained from macroblocks belonging to the first grid of macroblocks, the second value being calculated using focus metric data obtained from macroblocks belonging to the second grid of macroblocks, wherein the calculated first and second values have been corrected for the macroblock shift, selecting the focus setting (114) using a second predetermined selection criteria based on the first and second values of the figure-of-merit.

15 Claims, 7 Drawing Sheets

Fig. 2
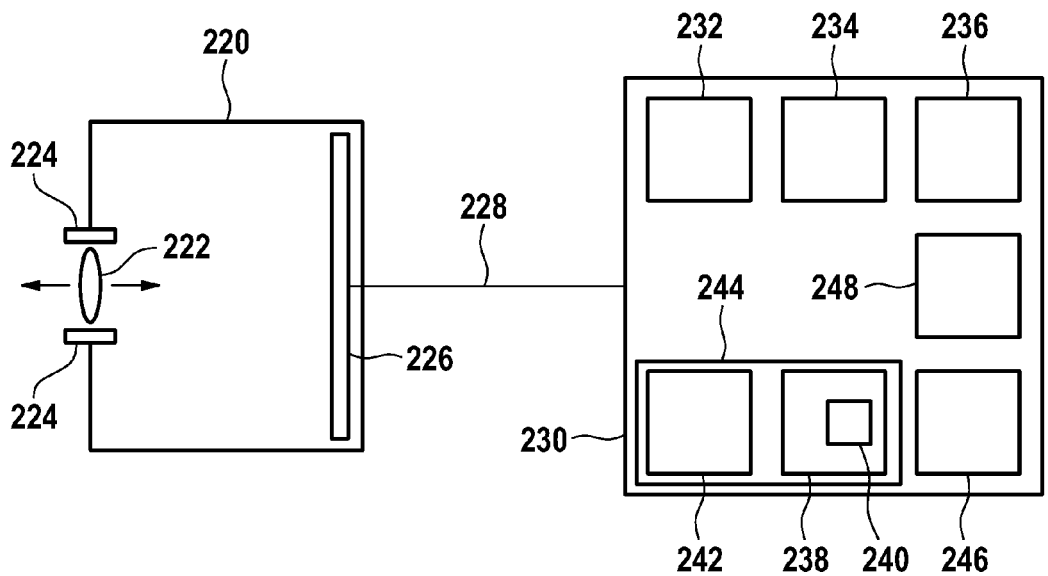
Fig. 3
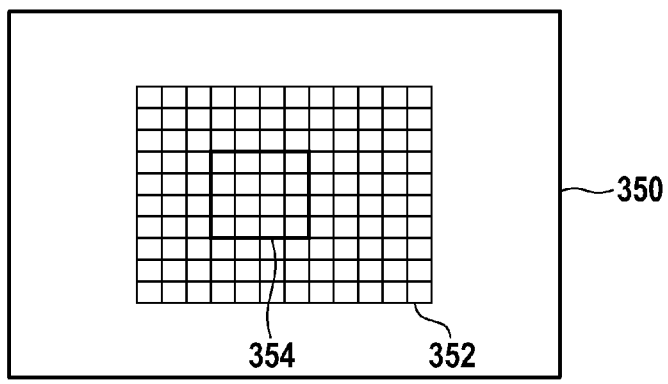
Fig. 4

METHOD AND DIGITAL IMAGING APPLIANCE ADAPTED FOR SELECTING A FOCUS SETTING

CLAIM FOR PRIORITY

The present application is a national stage filing under 35 U.S.C 371 of PCT application number PCT/EP2008/064810, having an international filing date of Oct. 31, 2008, which is incorporated by reference in its entirety.

BACKGROUND OF THE INVENTION

The majority of digital imaging appliances use a Charge Coupled Device (CCD) array or a Complementary Metal-Oxide-Semiconductor (CMOS) sensor to capture a digital image. In order to properly construct an image light from the object being imaged must be properly focused onto the array or sensor. In auto focusing digital imaging appliances, this is accomplished by acquiring multiple images with different focus settings. A focus figure-of-merit is calculated for each of these images. The figures-of-merit are then used by an algorithm to select the focus setting which focuses the image on the array or sensor.

One popular method to focus a camera is to drive the lens through a number of focus positions and capture a focus image at each of them (typically between 5 and 20 such frames are captured). A focus metric is then accumulated over one or more chosen regions of the focus images, typically called focus zones, based on various image filters which respond to suitable parts of the frequency spectrum, either band-pass or high-pass, and suppress noise. The lens position which corresponds to a peak, measured or interpolated, for one or more zones is then chosen to represent true focus.

However as this process takes time and for a hand held device or moving scene it is possible for motion to corrupt the focus metric. Within frame motion artifacts can be mitigated by limiting the focus exposure to a predetermined threshold, typically $\frac{1}{60}$th of a second. However between frames the scene region corresponding to each zone can change resulting in a change of the metric that is not related solely to focus.

A difficulty is that during the auto focusing, the camera can move slightly or objects that are being imaged can move between the acquisition of different frames. In order for cameras to properly focus, this motion needs to be accounted for when calculating the figure figure-of-merit for each of the images. Motion estimation has been used to track the individual zones and compute the focus metric over the tracked zone location. This approach is often successful but is highly complex and therefore not compatible with typical focus support hardware and is thus only feasible if it can be implemented in firmware or as part of a custom hardware solution. Such solutions are expensive and tend to consume large amounts of power which is not desirable for consumer appliances such as mobile phone camera modules.

The adjustment of the figure-of-merit to compensate for scene movement is known from U.S. Pat. No. 7,428,375 B2.

SUMMARY OF THE INVENTION

The invention provides for a method for selecting a focus setting, a computer program product for selecting a focus setting, and a digital imaging appliance. Embodiments of the invention are given in the dependent claims.

Embodiments address the aforementioned problems by using motion compensated windowing functions to compensate for modest motion during focus trace capture. It can be built on top of readily available autofocus support hardware leading to a more robust focusing capability that is not affected by small degrees of handshake or other motion during capture.

Embodiments of the invention may have at least one of the following advantages:

The primary advantage of this approach is that it overcomes the effects of motion during focus.

It can utilize standard hardware.

It provides a good compromise between computational simplicity and general utility.

It can be used in both focus range searching (as in the method describe in this disclosure) and continuous focus where at regular intervals a couple of lens positions are tested to see in which direction best focus lays and a small step is made in that direction.

The term focus setting is defined herein as a measure of the position of the lens relative to a light sensitive element adapted for capturing an image. The focus setting can be the actual distance between or it can be expressed in terms of any variable related to the distance. Examples would be the position of the lens in terms of stepper motors steps or the strength of an electrical signal to an actuator which moves the lens into a predetermined position.

A focus metric is defined herein as a measure of how focused an image is and is calculated for individual macroblocks For example, an image that is not in focus will be blurred, so the variance of the pixels is an example of a focus metric. A focus figure-of-merit or simply a figure-of-merit is defined herein as being a measure of how focused an image is and is calculated from the focus metrics of the macroblocks that make up the image. The figure-of-merit is compared between different images, so the value is adjusted to compensate for motion of the camera or the motion of objects being imaged. The phrase "accumulating a figure-of-merit" is defined herein as the calculation of a figure-of-merit from the focus metric of one or more macroblocks using a window function.

A color pixel can be represented by having a red value, a blue value, and a green value. The green sum is defined herein as the sum all (or significant proportion thereof) of the green values of the pixels in a specified region of pixels. A focus trace is defined herein as a plot showing the focus figure-of-merit as a function of focus setting.

A macroblock is defined herein as a group of pixels, preferably a rectangular group of pixels. The term 'macroblock' is a term defined by the Moving Pictures Expert Group (MPEG), and is a square block of 16×16 pixels. It is understood that a macroblock as defined herein does not have to be 16×16 pixels. The video coding techniques standardized by the MPEG include the capability to compress video by tracking the motion of macroblocks in subsequent frames using software algorithms or specialized hardware.

A similarity metric is defined herein as a measure of the similarity of a zone of macroblocks with a region of an image. A zone of macroblocks is a group of macroblocks.

When a digital imaging appliance is moving or objects within the image are moving as the digital imaging appliance is focusing, subsequent images used for determining the focus setting are different. However, major portions of the two images are identical. Embodiments of the invention compensate for movement during focusing by tracking the movement of macroblocks and using the knowledge of the motion of the macroblocks to correct figure of merit calculations for the effect of macroblock motion.

The definition of the term macroblock as is defined herein does not adhere to the specific pixel size of the macroblock as defined by the MPEG. However, an aspect of embodiments of the invention is that the technology which has been developed for MPEG video coding is directly applicable to tracking macroblock motion during the procedure of focusing a digital imaging appliance.

Embodiments of the invention provide for a method for selecting a focus setting for digital image acquisition appliance. The method comprising acquiring a first image with a first focus setting, then acquiring a second image with a second focus setting, the second image is acquired sequentially with the first image. The first image is then divided into a grid of macroblocks. Next the second image is divided into a second grid of macroblocks. Then a first zone in the first grid of macroblocks and a second zone in the second grid of macroblocks is determined using a predetermined selection criteria. The first zone is selected so that an accurate focus metric can be calculated. The second zone can have a different location within the second grid of macroblocks to account for motion of the camera and/or motion of objects being taken a picture of. The location of the second zone can be determined by estimating the movement of the first zone by estimating the motion of the first zone's macroblocks.

Next a first value of a figure-of-merit for the first image and a second value of the figure-of-merit for the second image is calculated. The first value is calculated using the focus metric data obtained from the macroblocks belonging to the first grid of macroblocks and the second value is calculated using the focus metric data obtained from macroblocks belonging to the second grid of macroblocks. The calculated values of the figure-of-merit have been compensated for the macroblock shift. Then a focus setting is selected using a second predetermined selection criteria and this value is based on the first and second values of the figure-of-merit.

This method has the advantage that it is very compact and does not use a lot of machine resources to calculate the focus setting. This method is advantageous, because the technology used for MPEG video coding is applicable for tracking the motion of macroblocks. The method can be implemented using software, or it can be implemented on special integrated circuits designed to process the motion macroblocks and calculate the figure-of-merit.

In another embodiment a window function is used to account for the effect of the sub-macroblock shift on the calculation in the first and second values of the figure-of-merit. This is an advantageous way of calculating the values of the figure-of-merit, because the image may shift by non-integral numbers of macroblocks. The window function averages the values that are used to calculate the figure-of-merit over an array or an area of macroblocks. The window function can be modified to incorporating the image shift into the calculation of the window function coefficients that are used to accumulate the figure of merit.

In another embodiment the window function is implemented as a two-dimensional Gaussian function and the window function is pre-computed to a tracking resolution of the shift. This is advantageous to implement this in this way, because the Gaussian window function is separable. It can be decomposed into two one-dimensional horizontal and vertical window functions. Because the Gaussian function can be decomposed in this way, the function can be pre-computed to the resolution necessary for the zone tracking. For example, if the window function were to be precomputed over an 8×8 grid of possible sub-macroblock offsets, the Gaussian function would need information for 16 different values for each element of the window, but a window function which cannot be decomposed into two one-dimensional functions would need to store 64 such values.

In another embodiment the sub-macroblock shift of the first zone with respect to the second zone is calculated by finding the minima of a quadratic surface fit to a first similarity metric between a first zone and a first overlapping region. The first overlapping region comprises the second zone and a border region around the second zone. The first similarity metric is either the sum of the absolute difference or sum of the square difference of the green zone between the first zone and the second overlapping region. This method is advantageous, because the green sum is a value which is calculated by some chipsets used for cell phone and other digital cameras. This allows information which is available to be used for calculating the macroblock shift and therefore for focusing a digital imaging apparatus. Fitting a quadratic surface to the similarity metrics is advantageous, because this allows one to calculate a sub-macroblock shift.

In another embodiment systematic bias in the calculation of the sub-macroblock shift is compensated for by subtracting a second sub-macroblock shift that is calculated by finding a second minima of a second quadratic surface fitted to a second similarity metric from the sub-macroblock shift that was calculated from the minima of the first quadratic surface. The second sub-macroblock shift is calculated by finding the minima of a quadratic surface fit to a second similarity metric between the first zone and a second overlapping region. The second overlapping region comprises the first zone and a border region around the first zone. The second similarity metric is calculated between the first zone and the first overlapping region using the same sum as was used to calculate the first similarity metric. This procedure is advantageous, because the quadratic surface fitted through the similarity surface includes a systematic bias that is governed by the shape of the quadratic surface itself. By accounting for the systematic bias in this way, a more accurate value of the sub-macroblock shift is determined.

In another embodiment the macroblocks are comprised of groups of contiguous pixels. The adjacent macroblocks are comprised of partially overlapping groups of pixels. This is advantageous, because it produces a form of spatial averaging that reduces the aliasing effect of sampling on the method.

In another embodiment three or more images are acquired sequentially for determining the focus setting. At least one figure-of-merit calculation is performed for each of the three or more images. The figure-of-merit calculation is corrected for the sub-macroblock shift between sequentially adjacent images of the three or more images and the focus setting is determined from the figure-of-merit calculations using a third predetermined selection criteria. This is advantageous, because many times cameras take more than two images to determine a focus setting. The method can be applied to a series of images. Then the image with the best figure-of-merit settings can be used to select the proper focus. Many times a cubic or quadratic function will be fit to the figure-of-merit data. This allows a more accurate determination of the proper focus setting.

In another aspect, a computer program product comprising machine executable instructions for performing the method is used. This is advantageous, because specialized computer or hardware for performing the method can be performed more rapidly than a human could. This allows the method to be integrated into a digital imaging appliance that is adapted for automatically focusing.

In another aspect, the invention provides for a digital image appliance comprising an image acquisition element for acquiring a first image with a first focus setting and for acquiring a second image with a second focus setting. The image acquisition element is adapted for acquiring the first and second images sequentially. It also comprises an image division element for dividing the first image into a first grid of macroblocks and dividing the second image into a second grid of macroblocks. The macroblocks are used for determining where the focus metric data is determined. Different types of images can be used to specify different grids of macroblocks to be used. For example if a portrait is being imaged, the macroblock grid should be in the center of the image where a person's face would likely be located. However, for a landscape picture distant objects are imaged and in this case the macroblocks would likely cover all or most of the image.

The digital image appliance further comprises a zone determination element for determining a first zone in a first grid of macroblocks and a second zone in a second grid of macroblocks using the first predetermined selection criteria. To select the first zone you would look at the number of almost saturated macroblocks in the zone to determine a good region to look for the focus metric. The second zone could be determined using hardware often used in MPEG encoding techniques to estimate the motion of the macroblocks that comprise the zone relative to their position in the first image.

The digital image appliance further comprises a macroblock shift calculation element for calculating a shift of the first zone with respect to the second zone to a sub-macroblock position. Calculating this to a sub-macroblock position is advantageous, because the macroblocks are comprised of a group of pixels, and if the camera moves or if an object moves within the field of the image it will likely not move in exactly an integral number of these pixels. The digital imaging appliance also comprises a figure-of-merit calculation element for calculating a first value of a figure-of-merit for the first image and a second value of the figure-of-merit for the second image. The first value is calculated using focus metric data calculated for macroblocks belonging to the first grid of macroblocks. The second value is calculated using focus metric data calculated for macroblocks belonging to the second grid of macroblocks and the calculated first and second values have been corrected for the macroblock shift.

The digital image appliance further comprises a focus setting selection element for selecting the focus setting using a second predetermined selection criteria based on the first and second values of the figure-of-merit. This digital imaging appliance is advantageous, because it is able to determine the focus using the macroblocks instead of using a pixel shift calculation. This requires fewer machine resources or computation time which allows this other focusing to be integrated into a larger variety of imaging appliances for example this can be integrated into the camera of a cell phone.

In another embodiment the figure-of-merit calculation element comprises a modified window function element adapted for performing figure-of-merit calculations with a window function in order to compensate for the sub-macroblock shift. The advantages of this have already been discussed.

In another embodiment the window of function element comprises a storage element for storing numerical data, the storage element contains pre-calculated values of the Gaussian function for reconstructing a shifted two-dimensional Gaussian function and the window function element is adapted for performing the figure-of-merit calculations using the two-dimensional Gaussian function. As was mentioned before, this is advantageous because the Gaussian function can be decomposed into two one-dimensional functions the advantages of which have already been discussed.

The first and second images are comprised of pixels. The image division element is adapted for calculating the values of macroblocks from contiguous groups of pixels and the contiguous groups of pixels of adjacent macroblocks partially overlap each other. This is advantageous, because this introduces a form of spatial averaging which reduces the effect of aliasing due to sampling on the determination of the focus setting. The advantages of this have already been discussed.

In another embodiment the image acquisition element is adapted for acquiring at least three images where the figure-of-merit element is further adapted for calculating a figure-of-merit calculation for the images and the figure-of-merit calculation is corrected for the sub-macroblock shift between sequentially adjacent images and the focus setting selector is further adapted for determining a focus setting from the figure-of-merit calculations using a third predetermined selection criteria. This is advantageous, because a larger number of images is used to determine the focus setting. The focus setting can be selected from a larger range of possible focus settings.

In another embodiment, the macroblock shift calculation element is implemented using an adaptation of a MPEG video coding algorithm. This embodiment has the advantage that the MPEG video coding algorithms can efficiently track the motion of macroblocks from frame to frame. Examples of how the macroblock shift calculation element can be implemented are: as a specialized integrated circuit or as a computer program product consisting of machine executable code for being executed by a microcontroller or computer.

In another embodiment the digital imaging appliance is further comprised of an integrated circuit. The integrated circuit comprises the figure-of-merit calculation element and the sub-macroblock shift calculation element. This is advantageous because this allows the focus to be determined with minimal numerical calculations by a computer or microprocessor. As was mentioned before, the technology used for determining the movement of macroblocks in MPEG video coding chips can be applied to this problem.

BRIEF DESCRIPTION OF THE DRAWINGS

In the following preferred embodiments of the invention will be described, by way of example only, and with reference to the drawings in which:

FIG. 2 shows an embodiment of a digital imaging appliance according to the invention, FIG. 3 shows a digital image with a portion divided into a grid of macroblocks, FIG. 4 shows a group of macroblocks.

DETAILED DESCRIPTION

Figure 1:
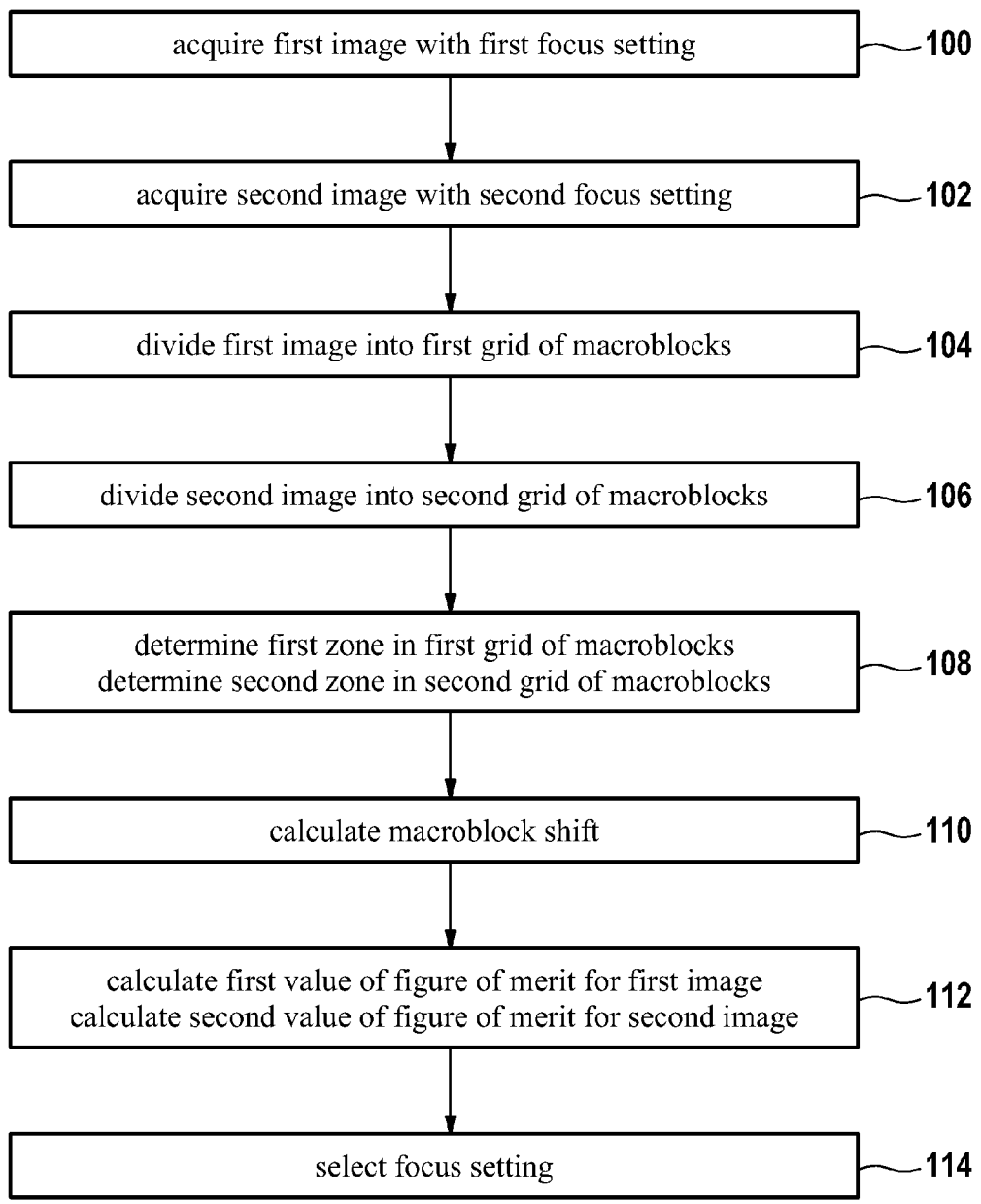
FIG. 1 shows an embodiment of a method for selecting a focus setting according to the invention.

FIG. 1 shows an embodiment of the method for selecting the focus setting. The steps of the method comprise acquiring a first image with a first focus setting 100, acquiring a second image with a second focus setting 102, divide a first image into a first grid of macroblocks 104, divide a second image into second grid of macroblocks 106, determine the first zone in a first grid of macroblocks and determine a second zone in second grid of macroblocks 108, calculate the macroblock shift 110, calculate first value of figure-of-merit for the first image and calculate the second value of figure-of-merit for the second image 112, and select the focus setting 114.

Typical autofocus support hardware provides a low resolution grid of focus information. Each grid location corresponds to a fixed area of the sensor and the stores accumulated focus data relevant to that location. The focus data can be one or more focus metrics resulting from the accumulated magnitude of the focus filter or filters over the neighborhood of the grid element plus an accumulated green sum or average for the same grid location. The image regions covered by each grid location are fixed throughout the focus process and are many pixels on a side. For example, a grid of 16×12 or more pixels can be used. Thus it is not possible to modify the location of the focus zone, which now corresponds to a contiguous sub-rectangle of grid points, more precisely than the grid size of the hardware. This level of granularity in the placement of the focus zone is not accurate enough to implement in the aforementioned method.

Referring to the accumulated figure-of-merit and green sum data for each grid location as a macroblock, as it corresponds to a rectangular sub-array of pixels; a sub-macroblock estimate of the motion 110 is found for a focus zone defined in the macroblock grid between subsequent frames of macroblock data for the focus sequence. The zone is chosen so as not to incorporate edge macroblocks in the grid and can therefore be any size up to (N−2)×(M−2) macroblocks where N is the horizontal dimension of the macroblock grid and M is the vertical dimension. It is possible that a motion signal can be estimated directly in hardware for each element of the macroblock grid. This could then be accumulated over the macroblocks that constitute the focus zone in order to get a best estimate for the motion of the zone itself. However if such a signal is not available then it is possible to estimate the sub-macroblock motion from the green sum data of the macroblock grid.

Sum squared distance computations followed by quadratic surface fitting produce reasonable estimates of sub-macroblock motion. The quality and robustness of the motion estimate is further improved if the process of macroblock accumulation involves some degree of anti-aliasing (that is the values accumulated in each macroblock arise from a region substantially larger than the macroblock grid element itself so that macroblock support regions considerably overlap). This is an important design criteria for hardware solutions.

Using the sub-macroblock motion estimate it is possible to generate a motion compensated estimate of the changing figure-of-merit for the focus zone between any pair of subsequent frames. This is done by using a modified Gaussian windowing function to accumulate the figure-of-merit data from the macroblocks that constitute the zone and a one macroblock border around the zone. This is why we the border macroblocks of the grid was not used to define the zone in the first place. A windowing function is often used to lessen the effects of exact location when accumulating data. Rather than having a sharply defined boundary a windowing function transforms smoothly from full accumulation to zero accumulation. A 2D Gaussian (symmetric or asymmetric) is a popular shape for a windowing function though other possibilities exist. It has the advantage that it is separable and can be composed from a pair of 1D Gaussian functions. The window functions can be modified to allow for the measured estimate of the motion of the macroblocks between frames. This is described below.

Alternatively the embodiment of the method shown in FIG. 1 can be implemented using specialized hardware. The first image 100 is acquired and then the second image 102 is acquired. The division of the first image into grid of macroblocks 104 and the division of the second image into a grid of macroblocks can be determined by the type of image. For instance for a landscape photograph, the most or all of the image can be divided into macroblocks. For a portrait the focus can be determined by dividing only the central portion of the image into macroblocks. The determination of the first zone of macroblocks and the second zone of the macroblock 108 and the calculation of the macroblock shift 110 can be implemented using algorithms used for MPEG image coding. The calculation of the figures-of-merit for the first and second images 112 and the select focus setting 114 can be performed as in the case where the green sum was used to calculate the macroblock shift.

FIG. 2 shows an embodiment of a digital imaging acquisition appliance. There is a housing 220 which encloses a CCD array 226. On the housing there is also mounted actuators 224 which are used for actuating a lens 222. The lens is adapted for being moved to different focal lengths with respect to the CCD array 226. The primary goal of the present invention is to determine the proper focus setting or essentially the proper distance between the lens 222 and the CCD array 226. The actuators 224 move the lens 222 into different positions, and images are acquired with the CCD array 226.

There is a connection between the CCD array 228 and the electronics assembly 230. The electronics assembly 230 can comprise integrated circuits and it can also comprise micro-controllers or microprocessors adapted for performing calculations. The electronics assembly comprises a CCD array controller 232, an image division element 234, a macroblock shift calculation element 236, a focus metric calculation element 238, a figure-of-merit calculation element 242, a focus setting selection element 246, and a zone determination element 248. These various elements could be implemented in hardware or they could be implemented as computer executable instructions that are performed by a micro-controller or a microprocessor. There can also be a mix between specialized integrated circuits and between elements that are implemented as machine executable instructions. In this figure the figure-of-merit calculation element 242 and the focus metric calculation element 238 are shown as being integrated into one specialized integrated circuit 244. Other elements that comprise the macroblock shift that comprise the electronics assembly could also be integrated into this or other specialized chips. The focus metric calculation element comprises a window function element 240. The window of function element is used to average over a spatial group of macroblocks. This allows the measured motion estimate to be compensated accurately.

FIG. 3 shows a digital image 350. The digital image 350 is comprised of individual pixels. A region of the digital image 350 has been divided into a grid of macroblocks 352. Within the grid of macroblocks 352 is located a zone 354. The zone 354 is the region for which the figure-of-merit is calculated. The zone can be moved within the grid of macroblocks to find the optimal place to determine the figure-of-merit. The task is to choose a zone 354 of macroblocks that can be tracked accurately to give an overall figure-of-merit estimate that is relevant and robust to motion. When choosing a zone 354, saturated and dark regions of the image should be avoided. Each possible zone 354 location is considered, allowing a one macroblock border for tracking. The primary selection criterion for the first zone 354 is the number of saturated macroblocks in the zone 354 and in a one macroblock border around zone 354. Secondary selection criteria for the first zone 354 include: absolute value of the green sum gradient (horizontal and vertical), the figure-of-merit divided by the green sum, and selecting the zone with a maximum Sum of Squares Difference (SSD) and/or Sum of Absolute Difference (SAD) over its eight neighbors.

FIG. 4 shows a group of macroblocks 452. These macroblocks are labeled C0 through C8. Each of these locations indicates a position where a similarity metric is calculated. A least squares fit can be used to fit a quadratic surface to the similarity metric. C0 is in the center and corresponds to the unshifted location and each of the surrounding macroblocks C1 through C8 correspond to a one macroblock shift. The similarity metric for each of these is calculated in each of the spots.

Using these values, the least square quadratic surface $$Z=aX^2+bY^2+cXY+dX+eY+f$$

can be constructed with the following coefficients:

$$a=((C1+C2+C8+C4+C5+C6)-2*(C0+C3+C7))/6;$$

$$b=((C2+C3+C4+C6+C7+C8)-2*(C0+C1+C5))/6;$$

$$c=((C4+C8)-(C2+C6))/4;$$

$$d=((C4+C5+C6)-(C1+C2+C8))/6;$$

$$e=((C2+C3+C4)-(C6+C7+C8))/6;$$

where C0 through C8 corresponds to the value of the similarity metric at that position.

The macroblock similarity metric is calculated using a Sum of Squares Difference (SSD) or using a Sum of Absolute Difference (SAD) over its nearest neighbors. The metric is accumulated over the set of macroblocks that comprise the selected focus zone. It is computed using the green sum value for the individual macroblocks.

Figure 5:
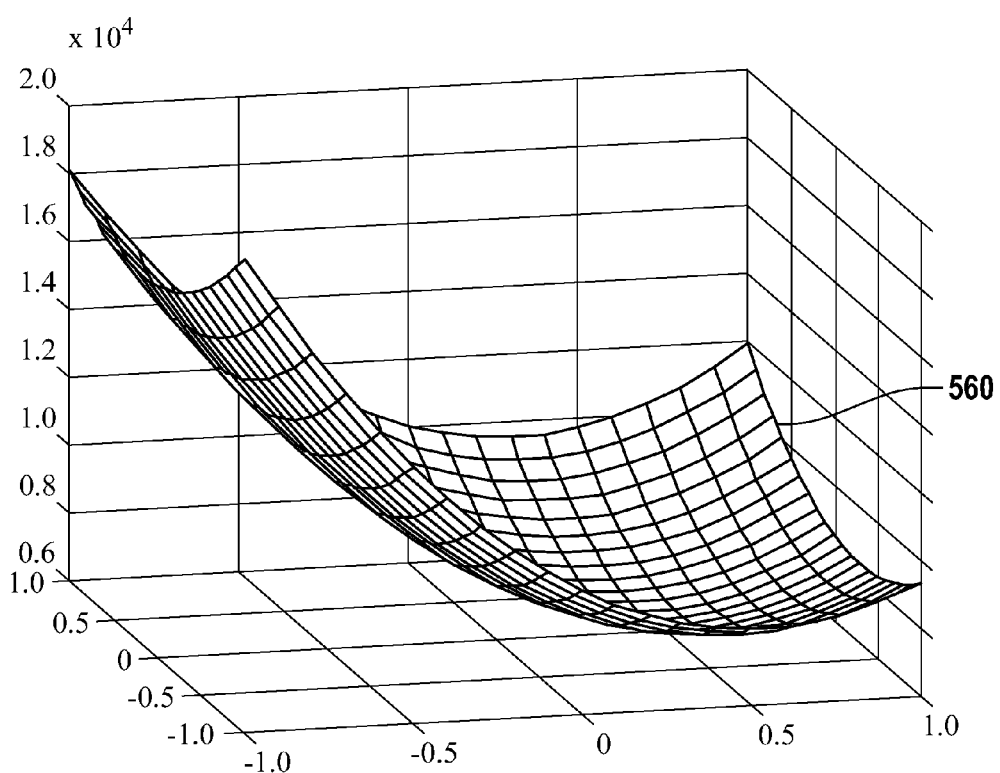
FIG. 5 shows a least square fit to an image similarity metric between the first zone and the second zone.

FIG. 5 shows an example of a quadratic surface 660 constructed with a lease squares fit for a similarity metric between the first zone and the second zone in the following image. The minimum of this surface is the sub-macroblock shift. The offset of the minima of the quadratic with respect to the centre of the macroblock labeled C0 is at location dX and dY (in macroblock sized units) given by the following formula:

$$dX=(2bd-ce)/(c2-4ab)$$

$$dY=(2ae-cd)/(c2-4ab)$$

However, there is a systematic bias due to the natural shape of the quadratic that fits through the data. This systematic bias can be compensated for by subtracting the offset determined by fitting a quadratic through a similarity metric of the first zone with its self from the estimate derived using the first and the second zones.

Figure 6:
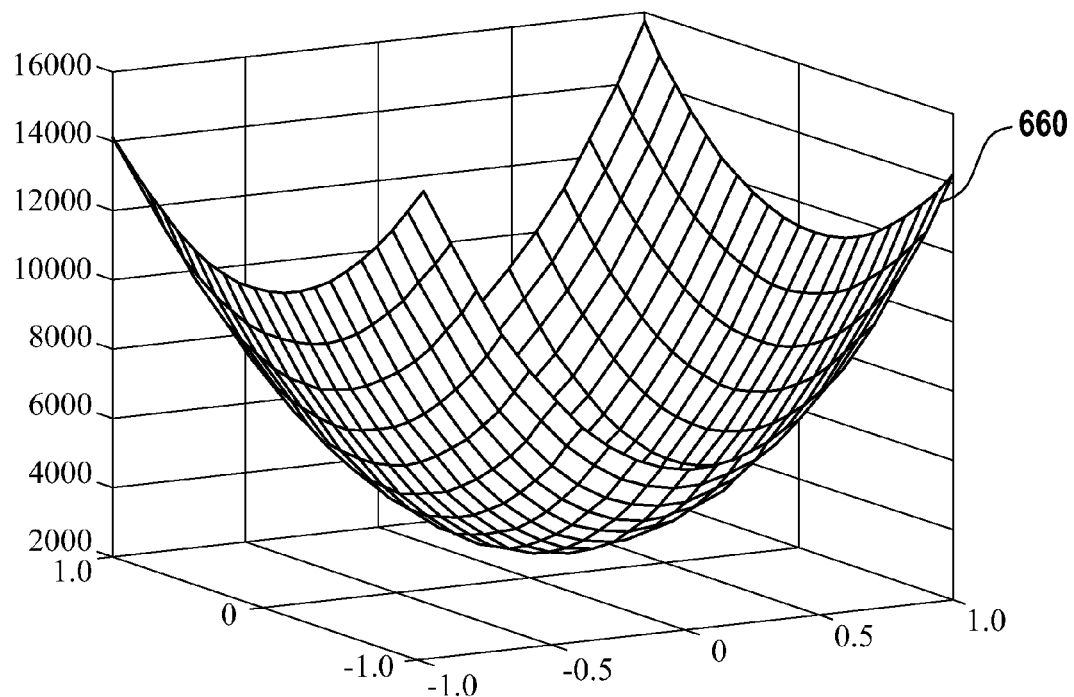
FIG. 6 shows a least square fit to an image similarity metric between the first zone and its self.

FIG. 6 shows the plot of a quadratic surface 660 fit to the similarity metric of the first zone with the macroblocks surrounding the first zone. The small systematic offset of the minima of this surface 660 is subtracted from the location of the minima in 560.

Figure 7:
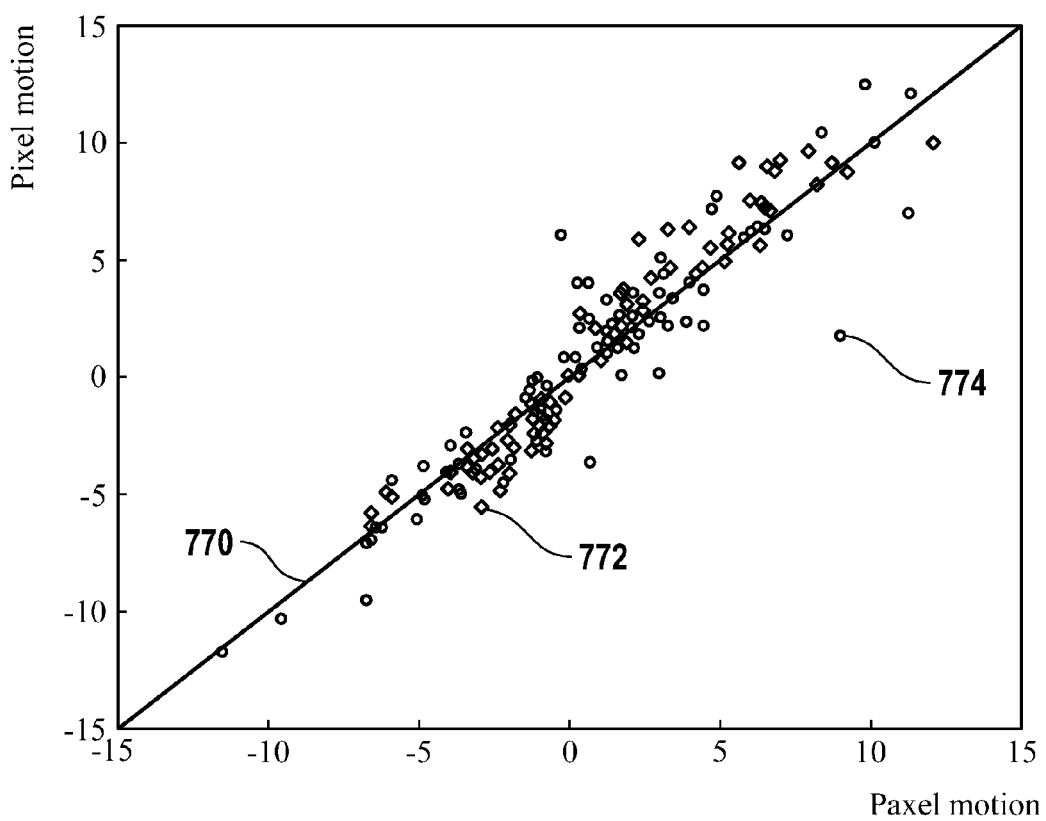
FIG. 7 shows a graph comparing sub-macroblock motion calculated using an embodiment of the invention against the actual pixel motion.

FIG. 7 shows a graph demonstrating the correlation between macroblock motion and pixel motion as calculated by an offline simulation using real image data. The comparison of sub-macroblock motion against pixel motion for image zones collected over a 98 frame motion sequence with a mean frame to frame motion of 5.9 pixels. The mean Euclidian error is 1.6 pixels (RMS 1.99 pixels). The macroblocks were 16×12 pixels. The line 770 shows the axle macroblock shift in relation to pixel motion. Using the method of an embodiment of the invention, the x component 772 and the y component 774 of the calculated macroblock shift are highly correlated as can be seen in FIG. 7. FIG. 7 demonstrates that the method allows for a reasonable estimate of the macroblock shift in relation to pixel motion.

Figure 8:
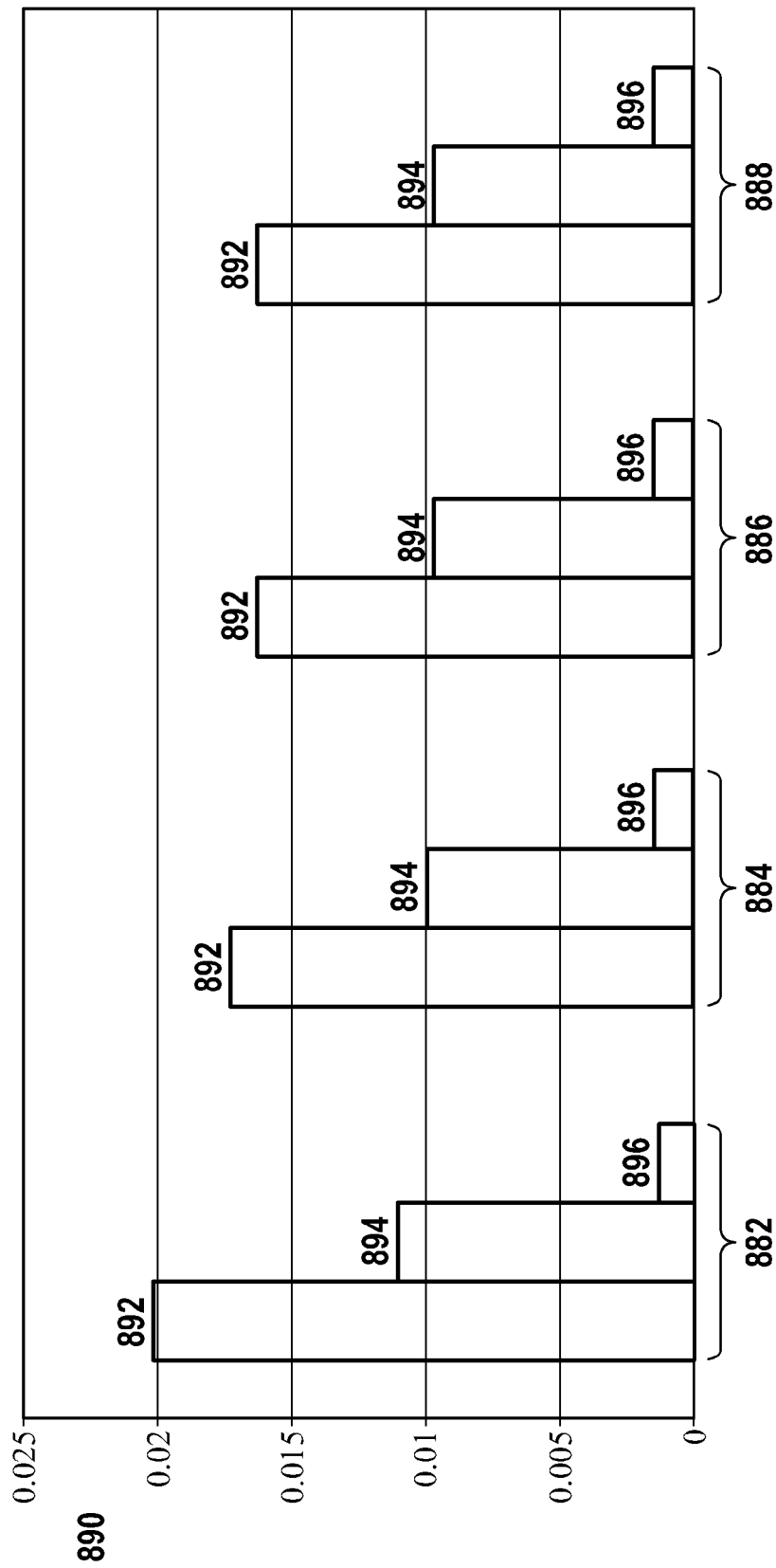
FIG. 8 shows a graph comparing figure-of-merit error for different methods of motion compensation.

FIG. 8 shows bar chart shows how the relative error of the figure-of-merit is reduced as the quality of motion compensation is improved. Four different methods are compared: The first is no compensation 882, the second is a Gaussian window 884, the third is a Gaussian compensation 886 and the fourth is pixel tracking 888. Each of these had been performed for three different situations, one for a fast move which corresponds to an average of 5.9 pixels per frame, for a slow motion 894 which corresponds to 2.6 pixels and for no motion at all 896. The no compensation 882, Gaussian window 884, and Gaussian compensation 886 are based on a macroblock figure-of-merit calculation and macroblock tracking while pixel tracking 888 uses pixel tracking and figure-of-merit accumulation. The Gaussian window 884 method uses a fixed window and does not utilize macroblock motion estimate, while The Gaussian compensation method 886 does. The figure-of-merit relative error is reduced as the quality of the motion compensation is improved. The relative error 890 is shown in comparison to four different methods.

Figure 9:
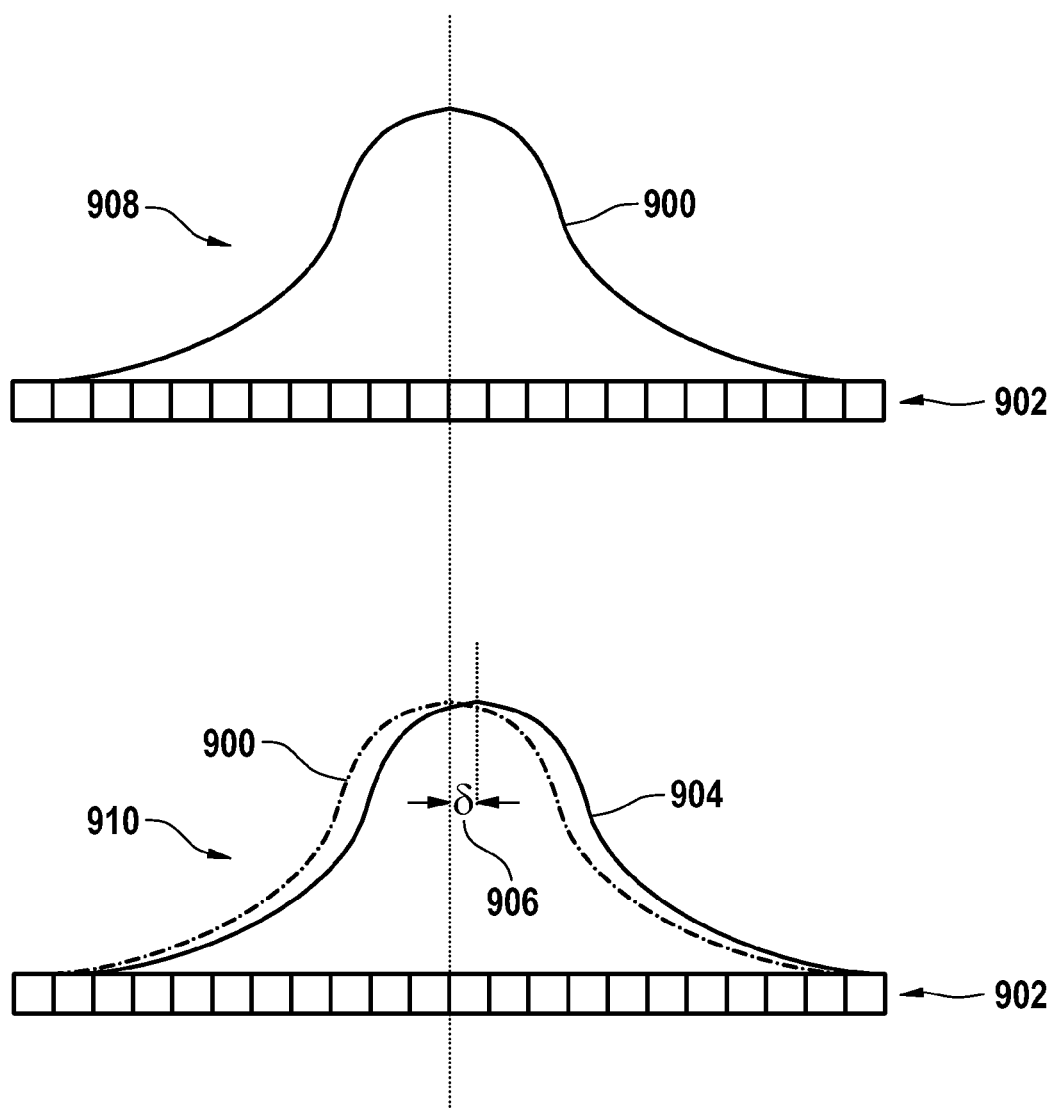
FIG. 9 shows a diagraph of a windowing function and a modified windowing function.

FIG. 9 show a one-dimensional illustration of how a windowing function can be modified to compensate for sub-macroblock motion.

In the top portion 908 of this figure a standard Gaussian windowing function 900 is used to calculate the figure-of-merit for macroblocks 902 beneath it. The Gaussian windowing function can be calculated as: $G(x)=\text{Exp}(-x^2/\sigma^2)$, where x is the position coordinate, and $\sigma$ is the standard deviation of the Gaussian function and must be chosen to allow the function to approach zero over the extent of the zone over which the function-of-merit is being calculated.

Each macro block of the one-dimensional grid is multiplied by the value of the windowing function at its location or the average value of the window over the width of the macroblock. The figure-of-merit can be calculated as:

$$FOM=\text{Sum}(B[i]\text{gaussWindow}[i]),$$

where FOM is the value of the function-of-merit, B is the value of the focus metric for a macroblock, i is an index used to reference all macroblocks, and gauss Window is the value of the Gaussian window function at the macroblock. A representative value of the window function can be chosen, or the Gaussian function can be averaged over the macroblock. The final quantized window function gaussWindow[i] can be normalized so that it sums to 1.0 over all possible values of i to make the method more numerically convenient.

Using a window function in this way has the advantage that edge effects on the function-of-merit are greatly reduced and hence some degree of tolerance to motion is introduced directly. However, the tolerance to motion can be increased further.

The bottom portion 910 of FIG. 9 illustrates that the location of the windowing function can be itself be modified to account for the sub-macro block shifts in the data accumulated into the macro-blocks themselves. The original Gaussian windowing function 900 and a modified Gaussian function 904 shifted by $\delta$ 906 are shown.

To implement this, a windowing function must be calculated accounting for the sub-macro block shift. The shifted one-dimensional Gaussian windowing functions are computed according to the function:

$$H(x)=\text{Exp}(-(1-\delta)^2/\sigma^2),$$

where x is the position coordinate, σ is the standard deviation of the Gaussian function and must be chosen to allow the function to approach zero over the extent of the zone over which the function-of-merit is being calculated, and δ is the sub-macroblock shift. The figure of merit is calculated as $$FOM=Sum(B[i]*gaussWindowShifted[i]),$$

Which is identical to gauss Window except uses H(x) to replace G(x) as the windowing function. Again gauss WindowShifted[i] can be normalized so that it sums to 1.0 over all possible values of i.

The quantized shifted windowing function gauss WindowShifted[i] can be implemented, by calculating the window function each time it is used with calculated value of δ. However, this would be computationally intensive, and this can be avoided by precalculating the window function for preselected values of δ. The values of δ can be chosen so that the difference between values is determined by a preselected accuracy of the motion estimate.

For example, if it is assumed the sub-macro block step up to the ⅛ a macro block is measurable, then we need only store 8 versions of the Gaussian function need be computed (and appropriately normalized) ahead of time. Each of these 8 functions corresponds to a different estimate of the motion shift.

The Gaussian is symmetrical so motion in the other direction can be computed from the same coefficients for the two-dimensional case. Since the 2D Gaussian window function is separable we only need store 2 sets of one-dimensional profiles. If the zone is square it would only be necessary to store a single set.

LIST OF REFERENCE NUMERALS

100 Acquire image with first focus setting
102 Acquire second image with second focus setting
104 Divided first image into first grid of macroblocks
106 Divide second image into second grid of macroblocks
108 Determine first zone in first grid of macroblocks and determine second zone in second grid of macroblocks
110 Calculate macroblock shift
112 Calculate first value of figure-of-merit for first image and calculate second value of figure-of-merit for second image
114 Select focus setting
220 Housing
222 Lens
224 Actuator
226 CCD array
228 Connection between CCD array and electronics assembly
230 Electronics assembly
232 CCD array controller
234 Image division element
236 Macroblock shift calculation element
238 Focus metric calculation element
240 Window function element
242 Figure-of-merit calculation element
244 Integrated circuit
246 Focus setting selector element
248 Zone determination element
350 Digital image
352 Grid of macroblocks
354 Zone
452 Macroblocks
560 Quadratic surface
660 Quadratic surface
770 Pixel shift
772 X component of calculated macroblock shift
774 Y component of calculated macroblock shift
882 No compensation
884 Gaussian window -continued 886 Gaussian compensation
888 Pixel tracking
890 Mean Relative Error (A − B)/(A + B)
892 Fast motion
894 Slow motion
896 No motion
900 gausian windowing function
902 Macroblock
904 Shifted gausian windowing function
906 Sub-macroblock shift
908 Top portion of figure
910 Bottom portion of figure

The invention claimed is:

1. A method for selecting a focus setting for a digital image acquisition appliance, the method comprising:
acquiring a first image with a first focus setting;
acquiring a second image with a second focus setting, the second image being acquired sequentially with the first image;
dividing the first image into a first grid of macroblocks;
dividing the second image into a second grid of macroblocks;
determining a first zone in the first grid of macroblocks and a second zone in the second grid of macroblocks using a first predetermined selection criteria, wherein the first predetermined selection criteria comprises the number of saturated macroblocks in the respective zone and in a macroblock order around the respective zone;
calculating a macroblock shift of the first zone with respect to the second zone to a sub-macroblock precision;
calculating a first value of a figure-of-merit for the first image and a second value of the figure-of-merit for the second image, the first value being calculated using focus metric data obtained from macroblocks belonging to the first grid of macroblocks, the second value being calculated using focus metric data obtained from macroblocks belonging to the second grid of macroblocks, wherein the calculated first and second values have been corrected for the macroblock shift;
selecting the focus setting using a second predetermined selection criteria based on the first and second values of the figure-of-merit, wherein the second predetermined selection criteria comprises a maximum sum of squares difference (SSD) and/or a sum of absolute difference (SAD).

2. The method of claim 1, wherein a window function is used to account for the effect of the sub-macroblock shift on the calculation of the first and second values of the figure-of-merit.

3. The method of claim 2, wherein the window function is a two dimensional Gaussian function, wherein the window function is pre-computed to a tracking resolution of the macroblock shift.

4. The method of claim 1, wherein the sub-macroblock shift of the first zone with respect to the second zone is calculated by finding a minima of a quadratic surface fit to a first similarity metric between the first zone and a first overlapping region, the first overlapping region comprising the second zone and a border region around the second zone, the first similarity metric being either the sum of the absolute difference or sum of the square difference of the green sum between the first zone and the second overlapping region.

5. The method of claim 4, wherein systematic bias in the calculation of the sub-macroblock shift is compensated for by subtracting a second sub-macroblock shift calculated by finding a second minima of a second quadratic surface fitted to a second similarity metric from the sub-macroblock shift, the second similarity metric being between the first zone and a second overlapping region, the second overlapping region comprising the first zone and a border region around the first zone, and the second similarity metric being calculated between the first zone and the second overlapping region using the same sum as the first similarity metric.

6. The method of claim 1, wherein macroblocks are calculated from groups of contiguous pixels, wherein adjacent macroblocks are calculated from partially overlapping groups of pixels.

7. The method of claim 1, wherein three or more images are acquired sequentially for determining the focus setting, wherein at least one figure-of-merit calculation is performed for each of the three or more images, the figure-of-merit calculations being corrected for the sub-macroblock shift between sequentially adjacent images of the three or more images, and wherein the focus setting is determined from the figure-of-merit calculations using a third predetermined selection criteria.

8. A non-transitory computer readable medium comprising machine executable instructions for performing the method of claim 1.

9. A digital imaging appliance comprising:
  an image acquisition element for acquiring a acquiring a first image with a first focus setting and for acquiring a second image with a second focus setting, the image acquisition element being adapted for acquiring the first and second images sequentially;
  an image division element for dividing the first image into a first grid of macroblocks and for dividing the second image into a second grid of macroblocks;
  a zone determination element for determining a first zone in the first grid of macroblocks and a second zone in the second grid of macroblocks using a first predetermined selection criteria, wherein the first predetermined selection criteria comprises the number of saturated macroblocks in the respective zone and in a macroblock border around the respective zone;
  a macroblock shift calculation element for calculating a shift of the first zone with respect to the second zone to a sub-macroblock precision;
  a focus metric data calculation element for calculating the value of a focus metric for a macroblock;
  a figure-of-merit calculation element for calculating a first value of a figure-of-merit for the first image and a second value of the figure-of-merit for the second image, the first value being calculated using focus metric data calculated from macroblocks belonging to the first grid of macroblocks, the second value being calculated using focus metric data calculated from macroblocks belonging to the second grid of macroblocks, wherein the calculated first and second values have been corrected for the sub-macroblock shift,
  a focus setting selector element for selecting the focus setting using a second predetermined selection criteria based on the first and second values of the figure-of-merit, wherein the second predetermined selection criteria comprises a maximum sum of squares difference (SSD) and/or a sum of absolute difference (SAD).

10. The digital imaging appliance of claim 9, wherein the figure-of-merit calculation element comprises a window function element adapted for weighting figure-of-merit calculations with a window function in order to compensate for the sub-macroblock shift.

11. The digital imaging appliance of claim 10, wherein the window function element comprises a storage element for storing numerical data, the storage element containing pre-calculated values of the Gaussian function for reconstructing a two dimensional Gaussian function, the window function element being adapted for weighting figure-of-merit calculations with the two dimensional Gaussian function.

12. The digital imaging appliance of claim 9, wherein the first and second images are comprised of pixels, wherein the image division element is adapted for calculating the values of macroblocks from contiguous groups of pixels, wherein the contiguous groups of pixels of adjacent macroblocks partially overlap each other.

13. The digital imaging appliance of claim 9, wherein the image acquisition element is adapted for acquiring at least three images, wherein the figure-of-merit calculation is further adapted for calculating a figure-of-merit calculation for the images, the figure-of-merit calculations being corrected for the sub-macroblock shift between sequentially adjacent images, and wherein the focus setting selector is further adapted for determining the focus setting from the figure-of-merit calculations using a third predetermined selection criteria.

14. The digital imaging appliance of claim 9, wherein the macroblock shift calculation element is implemented using an adaptation of a MPEG video coding algorithm.

15. The digital imaging appliance of claim 9, further comprising an integrated circuit comprising the figure-of-merit calculation element and the sub-macroblock shift calculation element.

* * * * *

UNITED STATES PATENT AND TRADEMARK OFFICE
CERTIFICATE OF CORRECTION

PATENT NO. : 8,421,906 B2
APPLICATION NO. : 13/126070
DATED : April 16, 2013
INVENTOR(S) : Stephen Pollard It is certified that error appears in the above-identified patent and that said Letters Patent is hereby corrected as shown below:

In the Claims

In column 13, line 25, in Claim 9, after "for acquiring" delete "a acquiring".

Signed and Sealed this
Twenty-seventh Day of August, 2013

Teresa Stanek Rea
*Acting Director of the United States Patent and Trademark Office*